United States Patent
Holopainen

(10) Patent No.: US 7,313,828 B2
(45) Date of Patent: Dec. 25, 2007

(54) METHOD AND APPARATUS FOR PROTECTING SOFTWARE AGAINST UNAUTHORIZED USE

(75) Inventor: Yrjö Holopainen, Bochum (DE)

(73) Assignee: Nokia Corporation, Espoo (FI)

( * ) Notice: Subject to any disclaimer, the term of this patent is extended or adjusted under 35 U.S.C. 154(b) by 844 days.

(21) Appl. No.: 09/944,405

(22) Filed: Sep. 4, 2001

(65) Prior Publication Data

US 2003/0046566 A1   Mar. 6, 2003

(51) Int. Cl.
H04L 9/00      (2006.01)
H04K 1/00      (2006.01)
G06G 21/00     (2006.01)

(52) U.S. Cl. .............................. 726/29; 726/5; 726/19; 713/168; 713/189; 380/270; 380/281; 380/284; 705/56

(58) Field of Classification Search ................ 713/173, 713/182, 187, 193–194, 200–201; 709/223–229; 380/200–201; 705/56
See application file for complete search history.

(56) References Cited

U.S. PATENT DOCUMENTS

| | | | |
|---|---|---|---|
| 4,757,534 A * | 7/1988 | Matyas et al. ................. | 705/56 |
| 5,029,207 A * | 7/1991 | Gammie ...................... | 380/228 |
| 5,109,413 A * | 4/1992 | Comerford et al. ........... | 705/54 |
| 5,592,651 A * | 1/1997 | Rackman ..................... | 711/163 |
| 5,734,819 A * | 3/1998 | Lewis ......................... | 713/200 |
| 5,754,761 A * | 5/1998 | Willsey ....................... | 713/200 |
| 5,790,663 A * | 8/1998 | Lee et al. ..................... | 705/56 |
| 5,799,086 A * | 8/1998 | Sudia .......................... | 705/76 |
| 5,841,865 A * | 11/1998 | Sudia ......................... | 380/286 |
| 5,850,451 A * | 12/1998 | Sudia ......................... | 380/286 |
| 5,857,022 A * | 1/1999 | Sudia ......................... | 713/173 |
| 5,872,849 A * | 2/1999 | Sudia ......................... | 713/175 |
| 5,991,404 A * | 11/1999 | Brahami et al. .............. | 705/51 |
| 5,999,629 A * | 12/1999 | Heer et al. .................... | 705/51 |
| 6,169,976 B1 * | 1/2001 | Colosso ....................... | 705/59 |
| 6,189,099 B1 * | 2/2001 | Rallis et al. ................. | 713/172 |
| 6,189,146 B1 * | 2/2001 | Misra et al. ................. | 717/177 |
| 6,289,455 B1 * | 9/2001 | Kocher et al. ............... | 713/194 |
| 6,363,482 B1 * | 3/2002 | Shani ......................... | 713/168 |
| 6,725,205 B1 * | 4/2004 | Weiler et al. ................. | 705/57 |
| 6,810,387 B1 * | 10/2004 | Yim ............................ | 705/57 |
| 2003/0005300 A1 * | 1/2003 | Noble et al. ................. | 713/172 |
| 2004/0203354 A1 * | 10/2004 | Yue ............................ | 455/41.1 |
| 2005/0108556 A1 * | 5/2005 | DeMello et al. ............ | 713/189 |
| 2005/0188228 A1 * | 8/2005 | DeMello et al. ............ | 713/201 |

OTHER PUBLICATIONS

Vainio, "Bluetooth Security", May 25, 2005, Department of Computer Science and Engineering Helsinki University of Technology, p. 1-15.*

* cited by examiner

Primary Examiner—Christopher Revak
(74) Attorney, Agent, or Firm—Alston & Bird LLP

(57) ABSTRACT

A method and apparatus which protects software against unauthorized use which is bound to at least one certain hardware device. The hardware device includes unique hardware identification sequences like unique hardware numbers/addresses, serial numbers or other embedded hardware characterization sequences. A special license key has to be passed to the software at the first activation. The license key contains among other things encrypted hardware identification sequences which are compared with the read out sequences of the accessible hardware devices. The use of the software features is permitted if the sequences match.

10 Claims, 4 Drawing Sheets

METHOD AND APPARATUS FOR PROTECTING SOFTWARE AGAINST UNAUTHORIZED USE

BACKGROUND OF THE INVENTION

1. Field of the Invention

The present invention relates generally to a method and apparatus for preventing the unauthorized use of software programs, and in particular, a method and apparatus of preventing the unauthorized use of software programs by unauthorized hardware devices.

2. Description of Related Art

The unauthorized use of software is a common problem for software developers and distributors. The use of personal computers at home and in the office has become widespread in the last decade. Software and hardware products provide a high level of functionality and their use is growing. Particularly, the use of personal computers at home is still rising and will extend further on. The more complex the software functionality and the greater the effort of development of the software the more important is the protection of software against unauthorized use. Although unauthorized copying of computer software is a violation of the law, the widespread availability of pirated software and limited enforcement capabilities have further enlarged the extension of software piracy.

Furthermore, software is distributed in growing number in combination with special hardware devices. This bounding of hardware devices with corresponding software utilities is often done to increase the value of hardware devices and to separate the bundled product from comparable products of competitors. Proprietary hardware devices with corresponding software are not subject to the problem of using hardware devices with software utilities of another manufacturer. But more and more hardware devices use standard interfaces to operate in combination with different software. Therefore, it is important for manufacturers to prevent the unauthorized use of software, which is developed to be distributed only in combination with the corresponding hardware devices. A further consideration of limiting the functionality of software with certain hardware devices can be a suitable means to tie a customer who purchased a hardware device to the same manufacturer. For example, the customer has to purchase the corresponding software product of the same manufacturer in order to gain access to all functions and options of the hardware. Therefore, the manufacturer is capable to calculate a mixed cost for the hardware and software products dependent upon the development expense.

Current methods of preventing the unauthorized use of software are not effective enough or a nuisance. The use of license keys is not effective as can be seen from the high number of available tools to remove license key inquiries or the huge number of published unauthorized license keys in the internet. Methods to generate license keys can often be determined fast. Also, it is not possible to monitor the usage of the software and in particular which use should only be authorized in combination with particular hardware devices.

An effective but uncomfortable method to protect the use of software is the use of hardware keys, called "dongles". These external devices execute a certain algorithm to produce a code which the computer receives and affords access to the software code if the code is correct. While the use of hardware keys is an effective way to reduce software piracy, additional hardware keys raise the problem of connecting them to the computer which executes the software. Standardized input/output ports are available and technically sufficient but conflicts with other connected hardware occurs often. Hardware keys are also costly to produce and the combination with software is rather questionable. Hence, effective hardware keys are limited economically to software applications of high value.

The problem associated with current protection methods of software is that there is no method available which combines the authorization process of software use with the check on certain hardware devices accessed by the software.

SUMMARY OF THE INVENTION

Therefore, there is a need for a secure and reasonable method and apparatus to prevent software bound to corresponding hardware devices from unauthorized use. The method and apparatus of protecting software against unauthorized use does not only secure the software use itself but also the unauthorized use of the software with comparable hardware devices of competitors. This is important in case of software which is additionally available. In order to employ the method and apparatus of the present invention at least one hardware device has to comprise a unique unalterable identification sequence such as identification numbers, serial numbers or other embedded unique code sequences which can be read out by the software and enable an unambiguous identification. This object is attained by the appended claims of the present invention.

A license key stored in the software or accessible by the software is required for executing the software. The kind of access of the software to the license key depends on the device able to execute the software. It is advantageous to store the license key in a separate file when the software is developed to be executed on a common personal computers. The software reads out the unique hardware identification sequence from the associated hardware module. The license key contains also at least one hardware identification sequence. The read out sequence and the contained sequences are compared. The use of the software is permitted and execution is allowed if both sequences match. The contained hardware identification sequences are co-coded in a license key which can also contain an additional classical software license key. The additional classical software license key can contain further software related information, e.g. sequences to identify the software program, sequences to identify the manufacturer or distributor of the software program and the like. The comparison of the contained hardware identification sequence and the read out identification sequence by the software allows to select between different authorization conditions. Therefore, it is possible to allow the use of the software by a certain sequence of identified hardware devices comprising the correct hardware identification sequence. The software license key need not only contain a single hardware identification sequence but a variety of sequences could be contained wherein only one or some contained sequences have to match. The hardware devices do not have to be connected electrically to the computer or a comparable device able to execute the software since wireless connections are getting more and more important especially also for home use.

Preferably, the hardware numbers which are contained in the license key are encrypted. There are several methods to encrypt the desired hardware identification sequences and co-code them in the required license key.

Conveniently, the encrypted hardware identification sequences are decrypted by using a secret key. This secret key is implemented and coded in the software code, respectively. The manufacturer or distributor of the software has to know the hardware identification sequences of the corresponding hardware devices which should be contained in the license key. The same secret key is used for encrypting this sequence and for decrypting. A comparable method is to use a secret a algorithm instead of a secret key. The same algorithm is used to encrypt as also to decrypt the hardware identification sequences contained in the license key. Therefore, this algorithm has to be implemented or coded in the software code, respectively. These two methods offer a relative protection against unauthorized use of the software. Moreover, these methods are implemented economically in software utilities of low costs.

More preferably, a public key encryption method is used to generate the license key and to retrieve the hardware identification sequences during the software execution. A public key encryption method requires two different keys, the secret key and the public key. The secret key is used to encrypt data which can only be decrypted using the public key. Contrary to the above described encryption methods the encryption key or method can not be extracted out of the software code. The secret key has not been implemented in the distributed software since the public key is sufficient to decrypt the contained hardware identification sequences. The secret key has only to be known to the responsible license key generating authority. The public key can be implemented in the software code but also submitted in combination with the license key or obtained via a web page or the like.

Conveniently, a freely obtainable public key and information about the internal format of the license key would enable the possibility of constructing a "hacked" key for certain unauthorized hardware devices since the software program is not able to distinguish between a legal public key of an authorized party and a public key of an unauthorized source. Therefore, the coding of the public key is advantageous.

Additionally, to prevent the simultaneous exchange of public key and license key, which would allow the unauthorized use of the software, the public key can be signed by a third authority. This signed public key is called generally a certificate. However, the signing of a key is based again on a public key encryption method described above. A corresponding pair of keys is used for encryption and decryption. The corresponding pair of keys is provided by a third party key authority often specialized for key providing. The public key of the manufacturer or distributor of the software is encrypted by the secret key of the third party key authority. In order to gain the public key which is used to decrypt the hardware identification sequences contained in the license key the corresponding public key of the third party key authority is applied to the certificate in order to decrypt the certificate. The staggered encryption by applying two secret keys each known to different independent key authorities makes it more difficult to overcome the protection of the software in favor of unauthorized use.

In case of the above described usage of a certificate distributed by the manufacturer or distributor of the software and a public key of a third key authority it is possible to distribute both the certificate and the third party public key via freely accessible sources. Possible sources can be for example a WEB server of the manufacturer or distributor providing the necessary certificate via WEB pages and download availability and providing additionally a hyperlink to WEB pages of the WEB server of the third party key authority in order to offer a complete set of certificate and public key to the vendor.

Preferably, the software program is bond to at least one network interface module. Network interface modules comprise a unique identification sequence of worldwide validity known as medium access control layer (MAC) address. The MAC address is perfectly suited for use as unique identification sequence. More preferably, the software program is bond to at least one Bluetooth™ module which comprises also a worldwide valid MAC address.

BRIEF DESCRIPTION OF THE DRAWINGS

Throughout the following, reference numerals will be used in the drawings, and like reference numerals will be used throughout the figures in the description to describe corresponding parts of embodiments of the invention.

DETAILED DESCRIPTION OF THE PREFERRED EMBODIMENTS

Figure 1:
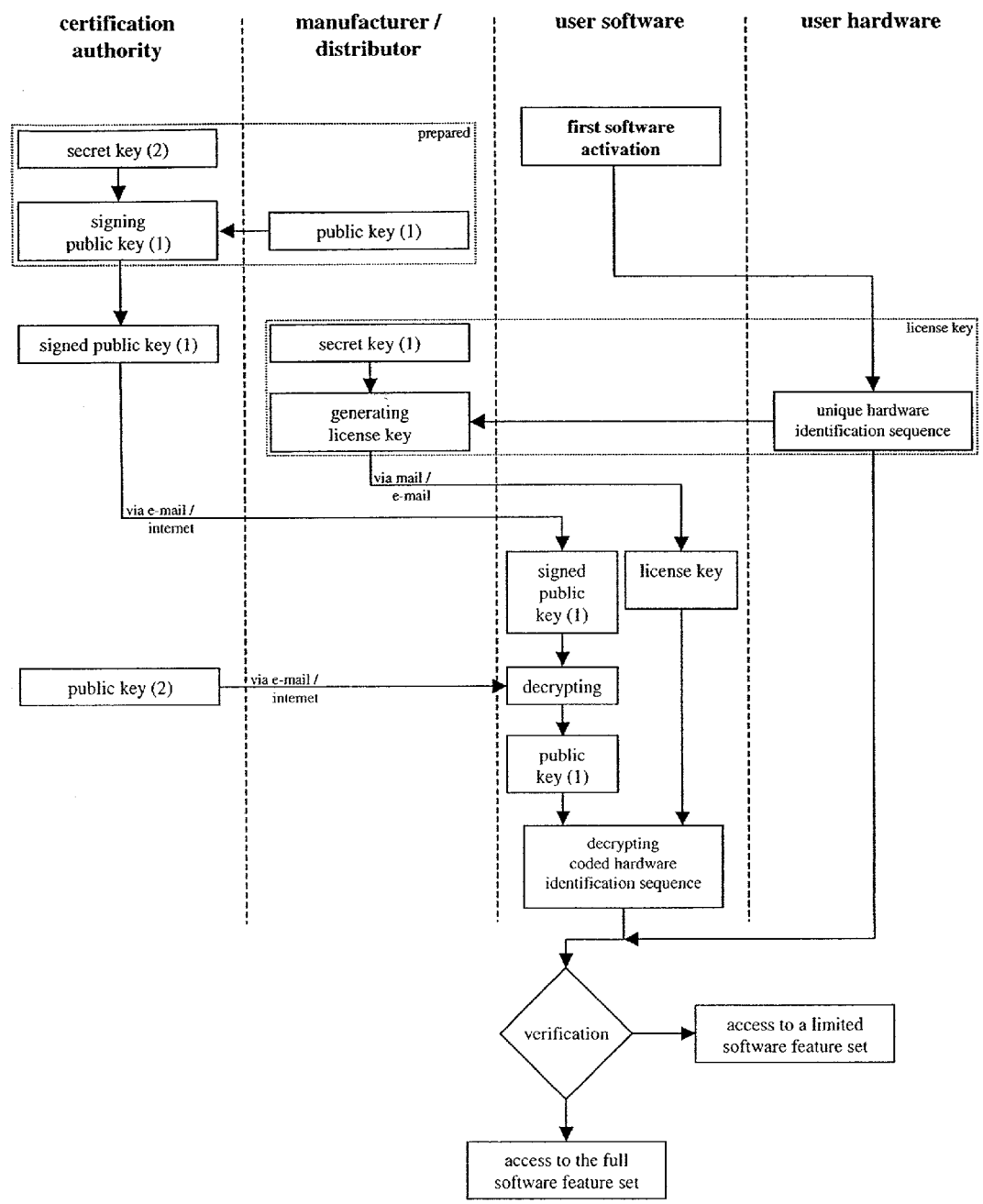
FIG. 1 is a flow chart illustrating the method steps performed to activate the protected software the first time.

FIG. 1 shows a flow chart as applied to apparatus used in implementing the present invention. The flow chart illustrates an embodiment according to the method and apparatus of the present invention. The shown embodiment applies the above described public key encryption method in combination with a signed public key and certificate, respectively.

A typical exemplary scenario shall be described below to enlighten the virtue of the software protection method against unauthorized use. Hardware devices and the corresponding software can be purchased via the internet using a web shop of the manufacturer or distributor or via a classical shop. If the purchase is performed via the internet contact information like mail address or e-mail address are submitted to the vendor. The hardware devices and the corresponding software are put together and sent to the purchaser. The respective hardware identification numbers can be obtained for example by the serial number of the hardware products. The unique hardware identification numbers and serial numbers are linked by a database system. To allow the use of the software also the license key has to be submitted to the purchaser. The hardware identification numbers are encrypted using a secret key according to a public key encryption method. In order to ensure a certain security of the secret key the encryption of the hardware identification numbers and the coding of the encrypted numbers in the license key should be performed by a single key authority to avoid a wide distribution of the secret key. The generated license key is submitted using preferably another way of submission. It is also possible that the license key has to be requested by the user. The user submits for example the serial number of the hardware devices in his property or the unique hardware identification numbers determined by a special software tool and a contact address to the key authority. The key authority has to be able to check the hardware numbers to ensure that the hardware device is authorized to be used in combination with the software. The user is now in possession of the hardware devices, the corresponding software and a personal license key.

A public key according to the secret key has also to be provided. Coding of the public key would be the simplest but also an unsafe way of providing. According to the currently preferred embodiment the public key is provided as a certificate or signed public key. The signed public key involves a third party key authority which encrypts the public key according to the secret key used for encrypting the hardware identification numbers contained in the license key. Both the signed public key and the public key of the third party key authority can be submitted to the user via e-mail or can be accessed by the user using the internet.

The software can now decrypt the hardware identification numbers of the license key in a two step decryption. In a first decryption step the signed public key or certificate, respectively, is decrypted using the public key of the third party key authority. This decryption results in the public key of the manufacturer or distributor. The following second decryption step involving the gained public key and the license key results in revelation of the hardware numbers contained in the license key. The contained hardware numbers are now compared with the hardware identification numbers read out by the software of the accessible hardware devices. If the numbers match access to the software, its execution is permitted to the user. In the other case it is for example possible to permit access to the software with limited functionality.

Due to the additional encryption of the public key used for decrypting the license key data, the manipulation of the software and thereupon the unauthorized use of the software is made more difficult in comparison to using a coded public key for decryption. The certificate ensures that only the public key of the manufacturer or distributor is a legal public key. Additionally, if the certificate and the corresponding public key of the third party key authority are submitted in any way parallel to the submission of the license key, the exchange of the keys is easier and once compromised keys can be exchanged against new secure ones.

Figure 2:
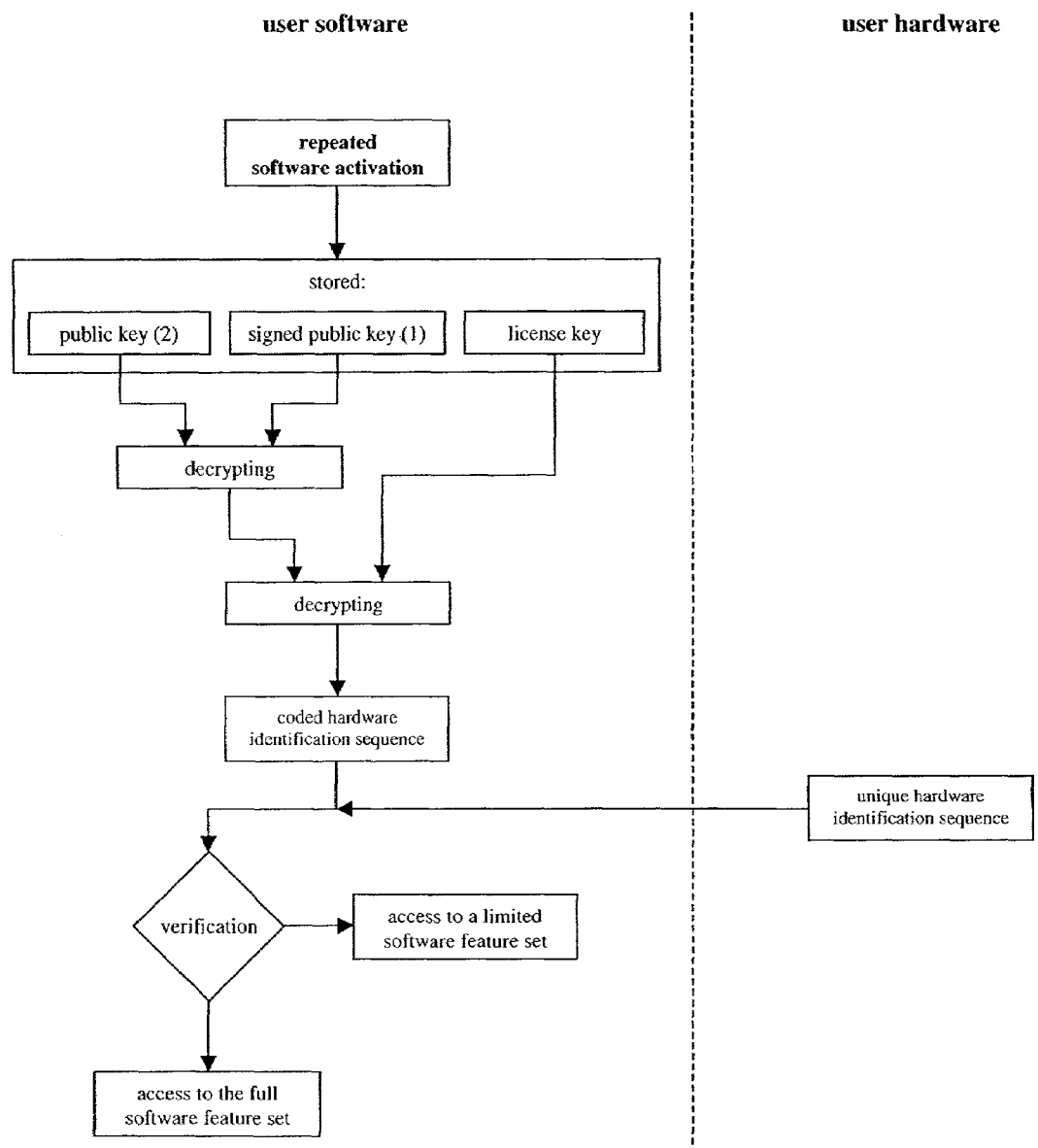
FIG. 2 is a flow chart illustrating the method steps performed to activate repeatedly the protected software after the first activation.

FIG. 2 is a flow chart illustrating the steps and functions of the method and apparatus performed to activate repeatedly the protected software after the first activation. In the present embodiment according to FIG. 2 the public key of the third party authority or certificate, respectively, the public key of the manufacturer or distributor and the license key are stored. Each time the software is restarted the signed public key is decrypted using the public key of the manufacturer or distributor and subsequent the contained hardware identification numbers are decrypted and extracted for the license key and compared with the accessible hardware devices in order to ensure that the authorized hardware devices are used. This proceeding ensures that the public key of the manufacturer can not be exchanged against a public key of an authorized party. Hereby, a complete protection against misuse of the software program is given.

Often software programs once installed on a computer system can not be copied and reinstalled on another one. In this case the protection against exchange of the public key of the manufacturer or distributor is not necessary any more. Hence, it can be sufficient to check only once the public key to ensure the origin of the public key from an authorized source. Only the decrypted certificate and the license key have to be stored which saves the execution of one decrypting process. The complete software protection is to be preferred, since the same decryption methods and algorithms are often used and the implementation of the complete staggered decryption process does not extend the software program to much.

Figure 3:
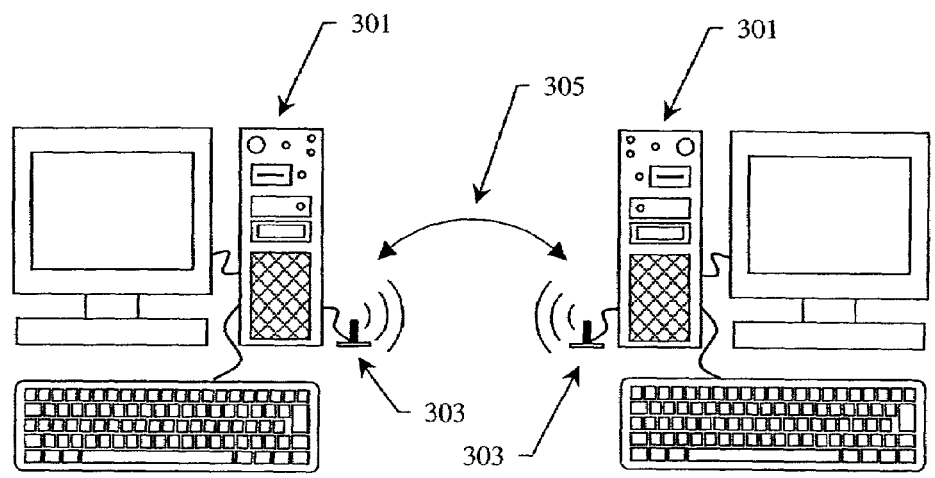
FIG. 3 shows a possible arrangement of two personal computers each equipped with a Bluetooth™ network interface as a further example of a hardware arrangement.

FIG. 3 shows a possible arrangement of two computers 301 each equipped with a Bluetooth™ network interface 303 as an example of a hardware arrangement. The both Bluetooth™ network interfaces 303 each comprise a unique hardware identification address. Both identification addresses can be read out by both software installed on one of the both computers 301 since Bluetooth™ network interfaces 303 are accessible from each other and all network interface cards have to comprise a unique hardware identification address to recognize them worldwide. Software applying the protection method according to the present invention can be installed on one of the two computers and checking if at least two Bluetooth™ network interfaces 303 comprising certain hardware identification address are accessible. It is even possible to co-code additional license conditions. For example, it could be coded that one of the Bluetooth™ network interfaces 303 has to be connected electrically to the computer which executes the software and the other of the network interfaces 303 is accessed via radio frequency transmission 305. Obviously, the number of verified hardware devices comprising unique hardware identification addresses can vary according to the license conditions.

Figure 4:
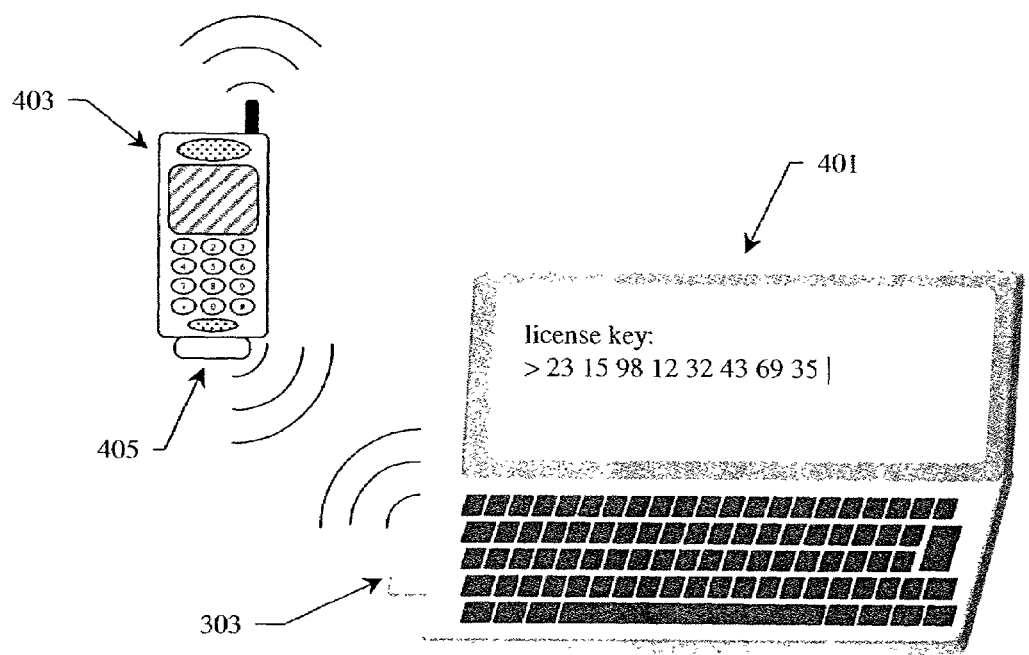
FIG. 4 shows a possible arrangement of a mobile terminal and a mobile phone each equipped with a Bluetooth™ network interface as a further example of a hardware arrangement.

FIG. 4 shows a possible arrangement of a mobile terminal 401 and a mobile phone 403 each equipped with a Bluetooth™ network interface 303, 405 as a further example of a hardware arrangement. This arrangement is similar to the arrangement shown in FIG. 3. A mobile phone 403 is used for linking a mobile terminal 401 to an access server to the internet. The data communication between mobile phone 403 and mobile terminal 401 is performed using Bluetooth™ network interfaces 303, 405. A special software is implemented on the mobile terminal 401 which use is only authorized in combination with a mobile phone 403 of a certain manufacturer. The manufacturer of the Bluetooth™ network interface 405 plugged on the mobile phone 403 distributes the necessary communication software which shall only be usable if this certain Bluetooth™ network interface 405 is connected. The software executed on the mobile terminal is protected against unauthorized use applying the method according to the present invention. The license key contains the Bluetooth™ hardware address of the Bluetooth™ network interface 405. The corresponding Bluetooth™ network interface 303 connected to the mobile terminal 401 is not involved in the verification process so that a Bluetooth™ network interface of any manufacturer can be used.

Figure 5:
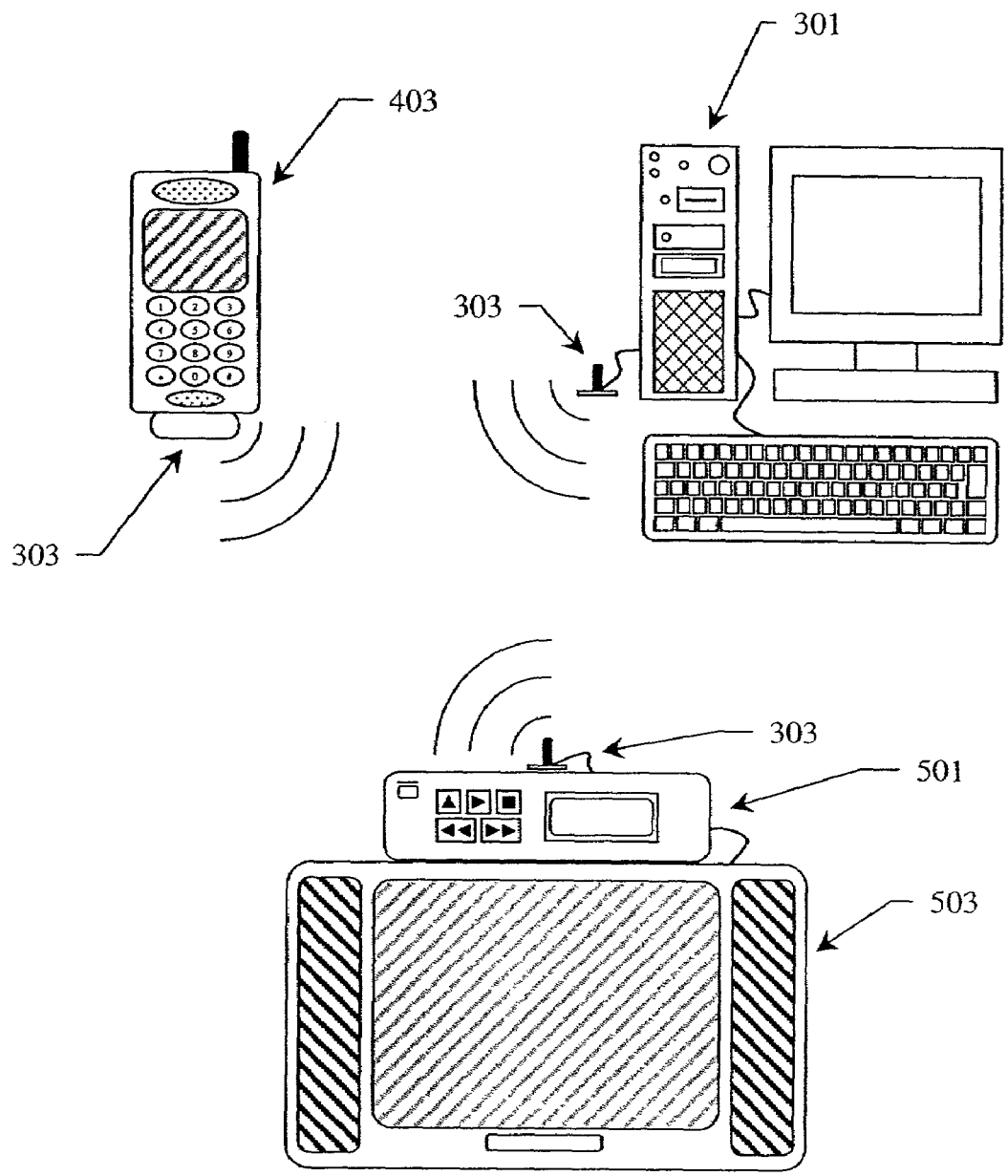
FIG. 5 shows a further embodiment involving a controller unit like a mobile phone or a personal computer both equipped with a Bluetooth™ network interface to control a home electronic device like DVD-Player, VCR-Recorder.

FIG. 5 shows a further embodiment involving a controller unit like a mobile phone 403 or a personal computer 301 both equipped with a Bluetooth™ network interface 303 to control a home electronic device 501 like digital versatile disk player (DVD), video recorder (VCR), digital video recorder (DVCR). Rising numbers of features included in home electronic devices requires just operable user interfaces. Particularly, video processing devices comprising multiple features are suitable to be equipped with interface devices for remote controlling by another terminal device, e.g. personal computer, mobile phone or the similar devices able to execute controlling software. A Bluetooth™ network interface can be implemented as preferred interface device. Related controlling software executed on the controlling devices has to be protected and shall only be usable in combination with the home electronic device of the certain manufacturer but executable on controlling devices of several manufacturer. Therefore, the method of the present invention is suitable to prevent unauthorized use of the software for controlling unauthorized devices of a competitor which implement the same controlling interface.

The forgoing description of the preferred embodiment of the invention has been presented for the purpose of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The method and apparatus to prevent unauthorized software use applies a unique hardware identification sequence of hardware devices accessed by the software. The identification sequence is compared with coded sequences in a special license key comprising hardware identification sequences. To protect the contained hardware identification sequences against unauthorized manipulation the sequences can be encrypted using different encryption methods according to the desired degree of protection. Accordingly, software which use is bonded to certain hardware devices can be protected effectively and reasonably by employing the method of the present invention.

What is claimed is:

1. A method for preventing unauthorized use of software accessing at least one specific hardware module comprising a unique hardware identification sequence wherein said software comprises a license key for being executed, comprising:

reading out said hardware identification sequence of said at least one specific hardware module, said reading out being performed at a processing device executing the software;

retrieving, at the processing device, a predetermined hardware identification sequence contained in said license key;

comparing, at the processing device, said read-out hardware identification sequence with said hardware identification sequence contained in the license key;

permitting execution of said software if both sequences match; and wherein said hardware identification sequence contained in said license key is encrypted and a first secret key coded in said software is used to decrypt said hardware identification sequence, wherein at least one of said specific hardware modules is a Bluetooth module comprising a unique Bluetooth hardware address that comprises said hardware identification sequence that is read out, and wherein said first secret key is encrypted additionally using a public key encryption method, comprising:

a second secret key which is only known to a trusted third authority; and a public key corresponding to said second secret key; and wherein said second secret key is used for encrypting said first secret key and said public key is used for decrypting said encrypted first secret key and wherein said public key is the only key which allows decrypting data encrypted by the second secret key.

2. A method for preventing unauthorized use of software accessing at least one specific hardware module comprising a unique hardware identification sequence wherein said software comprises a license key for being executed, comprising:

reading out said hardware identification sequence of said at least one specific hardware module, said reading out being performed at a processing device executing the software;

retrieving, at the processing device, a predetermined hardware identification sequence contained in said license key;

comparing, at the processing device, said read-out hardware identification sequence with said hardware identification sequence contained in the license key;

permitting execution of said software if both sequences match; and wherein said hardware identification sequence contained in said license key is encrypted and a secret algorithm coded in said software is used to decrypt said hardware identification sequence, wherein said secret algorithm is encrypted additionally using a public key encryption method, comprising:

a secret key which is only known to a trusted third authority; and a public key corresponding to said secret key; and wherein said secret key is used for encrypting said secret algorithm and said public key is used for decrypting said encrypted secret algorithm and wherein said public key is the only key which allows decrypting data encrypted by the secret key.

3. The method according to claim 2, wherein at least one of said specific hardware modules is a network interface module comprising a unique network interface address.

4. The method according to claim 2, wherein at least one of said specific hardware modules is a network interface module comprising a unique network interface address.

5. The method according to claim 4, wherein at least one of said specific hardware modules is a Bluetooth module comprising a unique Bluetooth hardware address.

6. A method for preventing unauthorized use of software accessing at least one specific hardware module comprising a unique hardware identification sequence wherein said software comprises a license key for being executed, comprising:

reading out said hardware identification sequence of said at least one specific hardware module, said reading out being performed at a processing device executing the software;

retrieving, at the processing device, a predetermined hardware identification sequence contained in said license key;

comparing, at the processing device, said read-out hardware identification sequence with said hardware identification sequence contained in the license key;

permitting execution of said software if both sequences match; and said hardware identification sequence contained in said license key is encrypted and a public key encryption method is used for encrypting and decrypting said unique hardware identification sequence contained in said license key, comprising a secret key which is only known to the license key distribution authorities; and a public key corresponding to said secret key; and wherein said secret key is used for encrypting said hardware identification sequence and said public key is used for decrypting said hardware identification sequence and wherein said public key is the only key which allows decrypting data encrypted by the secret key, wherein said public key is encrypted additionally using a public key encryption method, comprising:

a second secret key which is only known to a trusted third authority; and a second public key corresponding to said second secret key; and wherein said second secret key is used for encrypting said public key and said second public key is used for decrypting said encrypted public key and wherein said second public key is the only key which allows decrypting data encrypted by the second secret key.

7. The method according to claim 6, wherein at least one of said specific hardware modules is a network interface module comprising a unique network interface address.

8. The method according to claim 7, wherein at least one of said specific hardware modules is a Bluetooth module comprising a unique Bluetooth hardware address.

9. The method according to claim 6, wherein at least one of said specific hardware modules is a network interface module comprising a unique network interface address.

10. The method according to claim 6, wherein at least one of said at least one specific hardware modules is a network interface module comprising a unique network interface address.

* * * * *